(12) United States Patent
Kirkpatrick

(10) Patent No.: US 6,453,597 B1
(45) Date of Patent: Sep. 24, 2002

(54) RIGGING ASSEMBLY METHODS AND APPARATUS FOR TRAWLING NETS

(75) Inventor: Shea Kirkpatrick, Bellingham, WA (US)

(73) Assignee: LFS Inc., Bellingham, WA (US)

( * ) Notice: Subject to any disclaimer, the term of this patent is extended or adjusted under 35 U.S.C. 154(b) by 0 days.

(21) Appl. No.: 09/882,881

(22) Filed: Jun. 14, 2001

Related U.S. Application Data

(60) Provisional application No. 60/211,872, filed on Jun. 14, 2000.

(51) Int. Cl.[7] .................................................. A01K 73/02
(52) U.S. Cl. ........................................................ 43/9.1
(58) Field of Search .............................. 43/9.1, 9.7, 9.8, 43/7

(56) References Cited

U.S. PATENT DOCUMENTS

| | | | |
|---|---|---|---|
| 382,953 A | 5/1888 | Daniels | |
| 1,373,172 A | 3/1921 | Daubenspeck | |
| 2,736,122 A | * 2/1956 | Johnson | 43/9.7 |
| 2,914,878 A | * 12/1959 | Persson et al. | 43/9.1 |
| 3,048,936 A | 8/1962 | Luketa | |
| 3,188,766 A | * 6/1965 | Nicholls | 43/9.1 |
| 3,307,284 A | 3/1967 | Luketa | |
| 3,316,670 A | * 5/1967 | Johnson | 43/9.1 |
| 4,147,023 A | 4/1979 | Weidler | |
| 4,391,313 A | 7/1983 | Weidler | |
| 4,649,977 A | 3/1987 | Weidler | |
| 4,790,098 A | 12/1988 | Lu | |
| 4,882,870 A | 11/1989 | Andreasen | |
| 4,914,848 A | * 4/1990 | Kinoshita | 43/9.1 |
| 5,058,307 A | * 10/1991 | Garrett | 43/9.1 |
| 5,119,735 A | 6/1992 | Jang et al. | |
| 5,444,933 A | 8/1995 | Kinoshita et al. | |

OTHER PUBLICATIONS

Drawing Sheets 1 and 2 containing FIGS. 1 and 2.

* cited by examiner

Primary Examiner—Charles T. Jordan
Assistant Examiner—Danielle Rosenthal
(74) Attorney, Agent, or Firm—Michael R. Schacht; Schacht Law Office, Inc.

(57) ABSTRACT

A rigging system or apparatus for connecting together bridal and bridal lines of a trawling system. The rigging apparatus comprises a main member and two or perhaps three link members. The link members are interlocked with the main member. The rigging system is optimized for use in a conventional trawling system comprising a door assembly to which door legs are attached and a net to which bridal lines are attached. The door legs are detachably attached to the main member. A slack line is attached to the main member and may be detachably attached to the door assembly. Each bridal line is attached to one of the link members, and one (or more) pennant lines are attached to another of the link members.

19 Claims, 6 Drawing Sheets

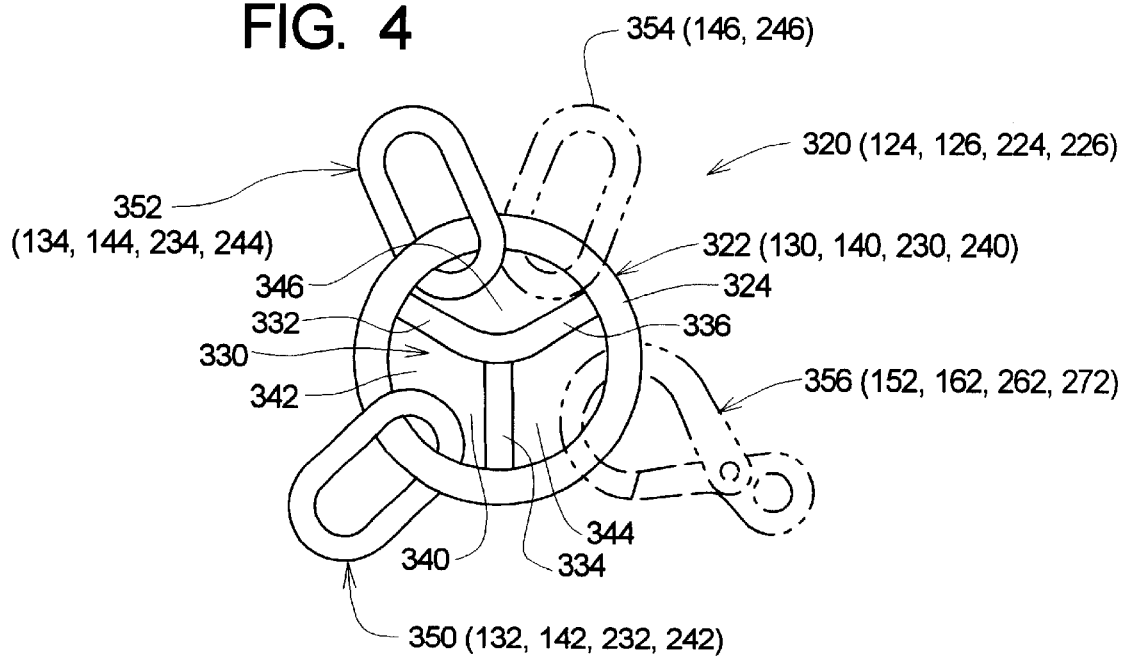
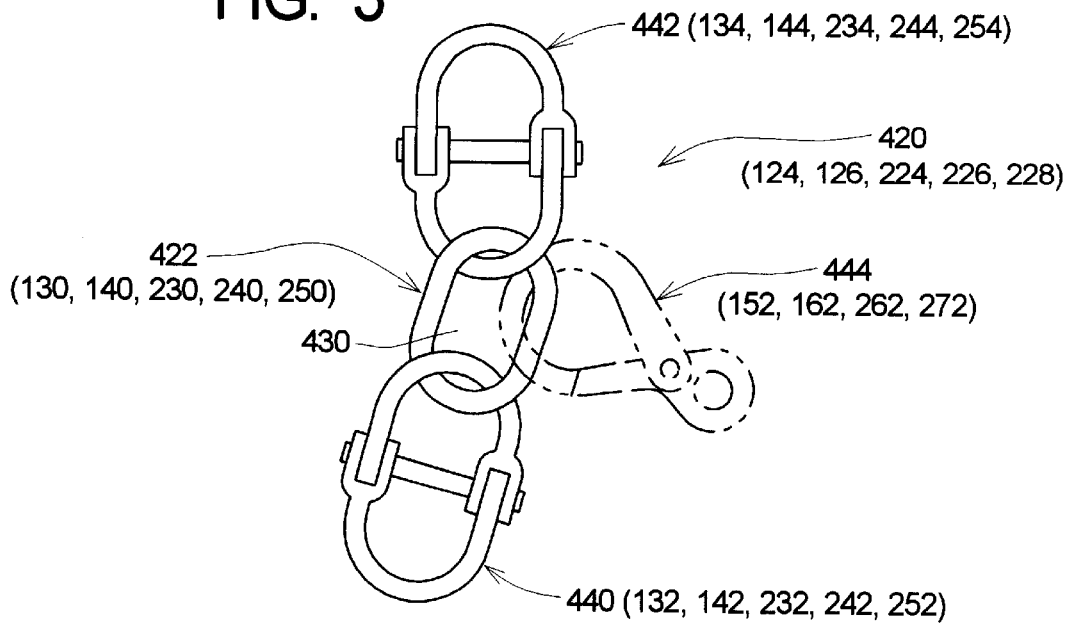

RIGGING ASSEMBLY METHODS AND APPARATUS FOR TRAWLING NETS

RELATED APPLICATIONS

This application claims priority of U.S. Provisional Patent Application Serial No. 60/211,872 which was filed on Jun. 14, 2000.

FIELD OF INVENTION

The present invention relates to riggings for commercial fishing nets and, more specifically, to systems and methods for commercial trawling operations.

BACKGROUND OF THE INVENTION

Trawling is a conventional fishing technique in which a net having one open end and one closed end is pulled through the water. The open end moves through the water first such that fish are caught within the closed end of the net. The net is then drawn up into the boat and emptied. Trawling is most commonly used during large scale commercial fishing operations.

The present invention is of particular significance when used as part of a trawling system comprising a single net towed behind a single boat, and that application will be described in detail herein. However, the rigging systems and methods of the present invention, and in particular certain of the rigging components, may have broader application to other trawling systems. The scope of the present invention should thus be determined by the claims appended hereto and not the following detailed description.

The rigging components used during commercial trawling are subject to extreme conditions, such as exposure to salt water and large forces, are relatively costly. Also, the rigging required to maintain the net at the desired depth and open as it is pulled through the ocean is relatively complex. The commercial rigging components thus form a substantial portion of the expense of a commercial trawling operation.

The need thus exists for improved rigging systems and methods for commercial trawling operations.

SUMMARY OF THE INVENTION

A rigging system or apparatus for connecting together door legs and bridal lines of a trawling system. The rigging apparatus comprises a main member and two or perhaps three link members. The link members are interlocked with the main member. The rigging system is optimized for use in a conventional trawling system comprising a door assembly to which door legs are attached and a net to which bridal lines are attached. The door legs are detachably attached to the main member. A slack line is attached to the main member and may be detachably attached to the door assembly. Each bridal line is attached to one of the link members, and one (or more) pennant lines are attached to another of the link members.

BRIEF DESCRIPTION OF THE DRAWINGS

FIG. 4 is an elevation view of a first exemplary connector assembly that may be used as part of the rigging system of the present invention;

FIG. 5 is an elevation view of a second exemplary connector assembly that may be used as part of the rigging system of the present invention;

DETAILED DESCRIPTION

Figure 1:
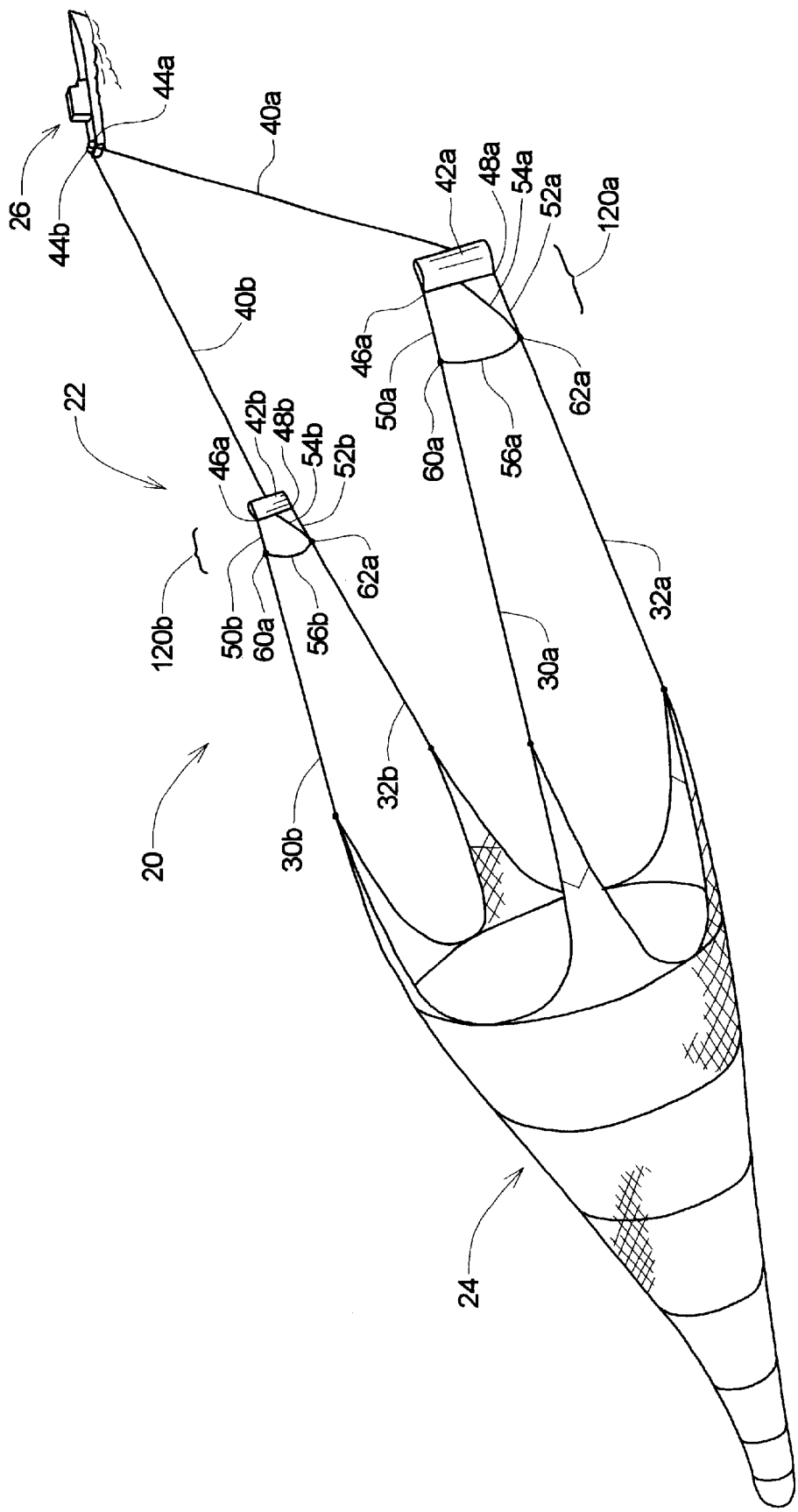
FIG. 1 is a perspective, somewhat schematic view of a first exemplary trawling system that may incorporate a rigging system of the present invention.

Referring now to FIG. 1 of the drawing, depicted therein is a trawling system 20 incorporating a rigging system 22 constructed in accordance with, and embodying the principles of, the present invention. The trawling system 20 is in many respects conventional and will be described herein only to the extent necessary for a complete understanding of the present invention.

The trawling system 20 comprises a net 24 and a boat 26. Attached to each side of the net are upper and lower bridal lines 30 and 32. Main wires 40 extend from each side of the boat 26 between two spacing door assemblies 42 and two winch assemblies 44. The spacing door assemblies 42 are hydrodynamically designed to move away from each other as the boat 26 pulls the net 24 through the water. The spacing door assemblies 42 also vertically space the upper and lower bridal lines 30 and 32 from each other. The spacing door assemblies 42 thus ensure that the net 24 is properly deployed as long as the boat 26 maintains forward motion.

In general, the rigging system 22 connects the bridal lines 30 and 32 to the spacing door assemblies 42. As is conventional, the rigging system 20 comprises upper and lower door leg assemblies 50 and 52 that are connected to the upper and lower bridal lines 30 and 32 at upper and lower connection points 60 and 62. The door leg assemblies 50 and 52 are also connected to upper and lower connection points 46 and 48 on each of the door assemblies 42. A slack line assembly 54 is attached to at least one of the bridal lines 30 and/or 32 and is detachably attached to each of the door assemblies 42. A pennant line assembly 56 is also conventionally connected between the connection points 60 and 62.

The trawling system 20 operates basically as follows. The net 24 and spacing door assemblies 42 are connected to the winches 44 as generally described above with the net 24 in the water. The spacing door assemblies are then placed in the water with the boat 26 moving. The winches 44 let out the main wire 40 at a rate slower than the speed of the boat 26 until the net 24 is at a desired depth and distance behind the boat 26. After a period of time, the winches 44 are operated to draw the door assemblies 42 back into the boat 26. The slack lines 54 are then detached from the door assemblies 42 and connected to a net drum (schematically depicted at 70 in FIG. 2). At the same time, the door leg assemblies 50 and 52 are detached from the connection points 60 and 62. The net drum 70 is then rotated to take in the bridal lines 30 and 32 and, ultimately, the net 24. The fish caught in the net 24 are then removed.

The net 24 and bridal lines 30 and 32 are then let out until the slack lines 54 are adjacent to the doors. At this point, the door leg assemblies 50 and 52 are reattached to the connection points 60 and 62. The door assemblies 42 are then placed into the water again and the process is repeated.

Figure 2:
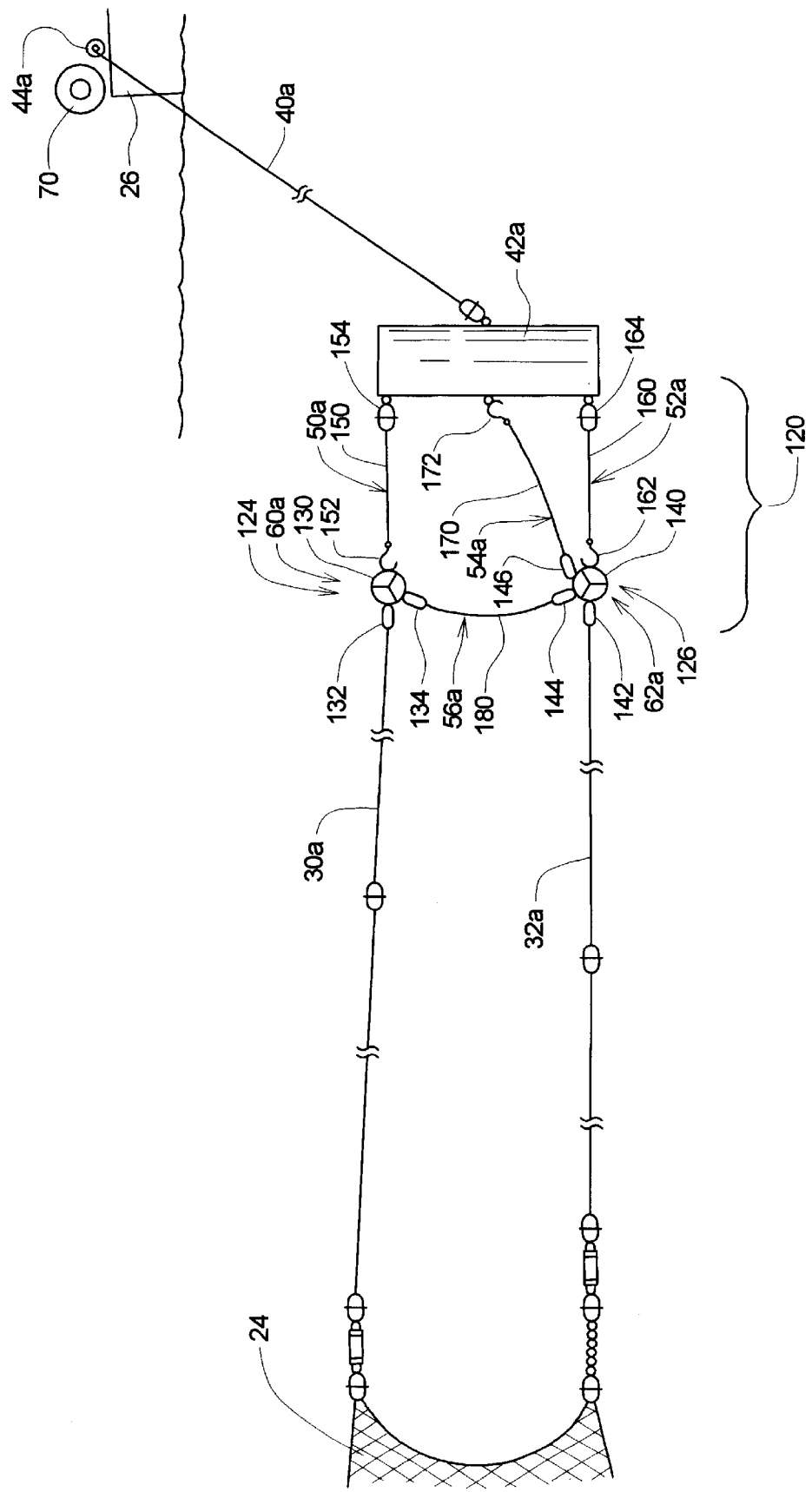
FIG. 2 is a somewhat schematic side elevation view depicting one half of a first exemplary rigging system that may be used as part of the trawling system of FIG. 1, with the other half of the riggin system being substantially symmetrical to the half shown.

The present invention relates to the rigging system 120 for connecting the door leg assemblies 50 and 52 to the bridal lines 30 and 32 and the methods and apparatus used to implement this system 120. Referring now more specifically to FIG. 2, one-half of an exemplary embodiment the rigging system 120 is depicted therein. The other half of the rigging system 120 will usually, but not necessarily, be substantially the same as the portion depicted in FIG. 2.

The exemplary rigging system 120 comprises, in addition to the first and second door leg assemblies 50 and 52, slack line assembly 54, and pennant line assembly 56, first and second connector assemblies 124 and 126 located at the connection points 60 and 62.

The first connector assembly 124 comprises a first main member 130 and first and second link members 132 and 134. The second connector assembly 126 comprises a second main member 140 and third, fourth, and fifth link members 142, 144, and 146.

The exemplary door leg assembly 50 comprises a first door leg 150, a detachable connector 152, and a fixed connector 154. The exemplary door leg assembly 52 similarly comprises a second door leg 160, a detachable connector 162, and a fixed connector 164. The fixed connectors 154 and 164 are connected to the door assemblies 42 in a conventional manner. The exemplary door leg assembly 54 comprises a door leg 170 and a detachable connector 172. The exemplary pennant line assembly 56 simply comprises a pennant line 180.

In the context of this application, the term "detachable" attachment is primarily used herein to refer to a connecting assembly that allows a line to be detached by hand without the use of tools. The term "attached" generally refers to a connection of a line to another member that, while detachable, may require tools or the like to disconnect a line. The term "connection" or "operative connection" is used herein to refer to two members joined together such that they do not separate under tension and under normal operating loads. When operatively connected, two members may be directly connected or connected indirectly through one or more other members.

In this context, the detachable connectors 152, 162, and 172 would constitute a detachable attachment, while the fixed connectors 154 and 164 would constitute an attachment. Any connector that meets these requirements could be used in place of the detachable connectors or fixed connectors described herein.

The upper bridal line 30 is connected to the first link member 132, while the lower bridal line 32 is connected to the third link member 142. The pennant line 180 is connected at one end to the second link member 134 and at the other end to the fourth link member 144. The slack line 170 is connected at one end to the fifth link member 146. The attachment, detachable attachment, or connection of any of the lines discussed herein and a connector or link member is well-known and conventional and will not be described in detail herein.

The first and second door legs 150 and 160, the slack line 170, and the pennant line 180 are preferably all made of a rope, line, or cable that resists inherent torque while under tension (referred to herein as "torqueless line"). More specifically, the Applicant has found that HMWPE in a braided construction, such as lines manufactured under the tradenames Spectra™ and Dyneema™, may be used to form the door legs 150 and 160, the slack line 170, and the pennant line 180. These products are made of polymer fibers that are very light and very strong. Further, when these products are under tension, they do not tend to rotate about their longitudinal axis as will other ropes or cables that are woven instead of braided.

When the door assembly 42 is connected to the bridal lines 30 and 32 through the rigging system 22, the trawling system 20 may operate in a generally conventional manner. The rigging system 22 reduces the costs of the various components used as part of the trawling system 20.

Figure 3:
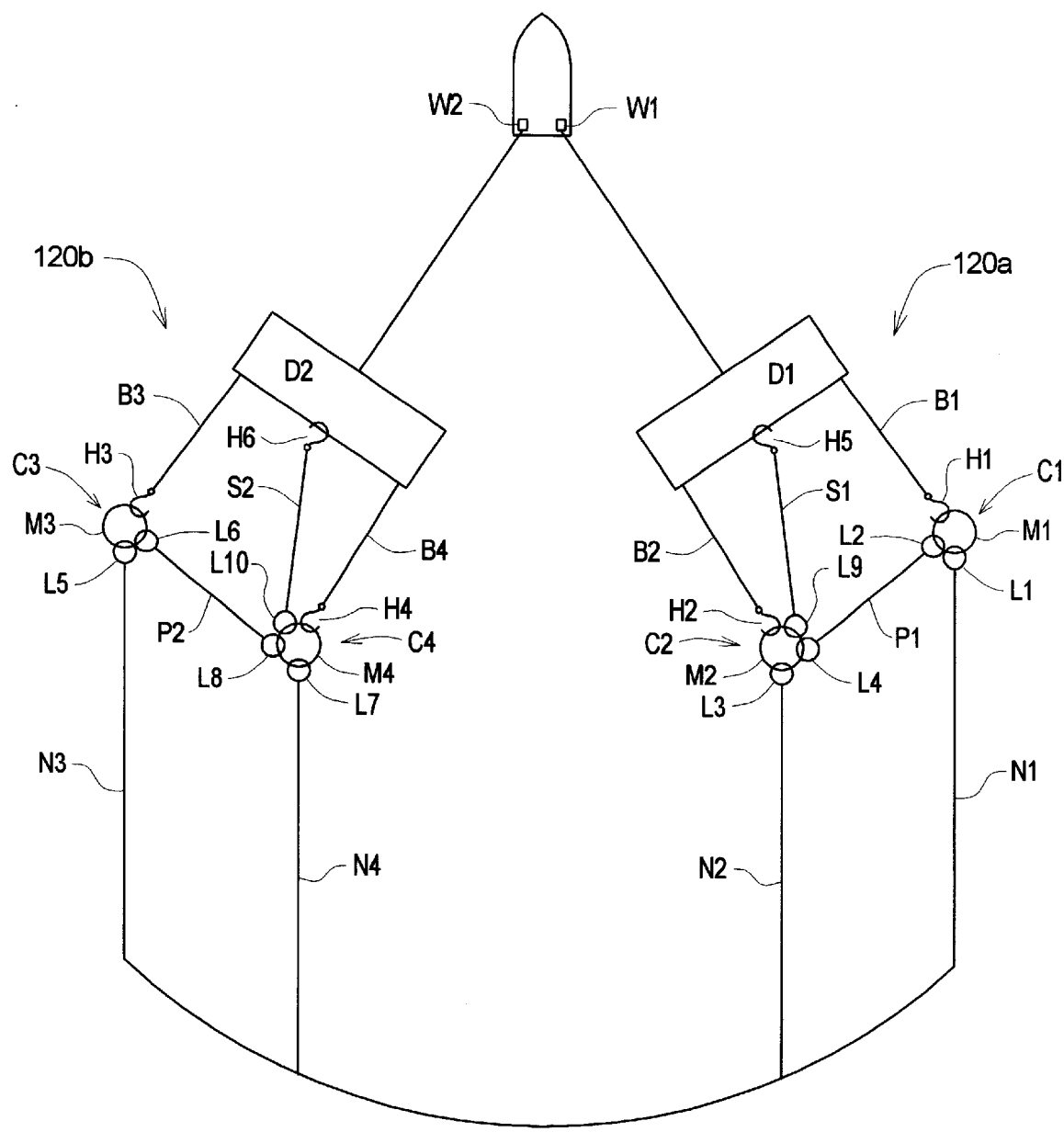
FIG. 3 is a highly schematic top plan view of the trawling system of FIG. 1.

Referring now to FIG. 3, depicted therein is a highly schematic representation of the rigging system 120. FIG. 3 uses the letter C to refer to a connector, the letter M to refer to a main member of a connector, the letter L to refer to a link member of a connector, the letter N to refer to a bridal line, the letter B to refer to a door leg, the letter S to refer to a slack line, the letter P to refer to a pennant line, the letter H to refer to a hook connector, the letter D to refer to a door assembly, and the letter W to refer to a winch. The numbers following these uniquely identify each of the non-trivial components of the entire system 120.

Figure 6:
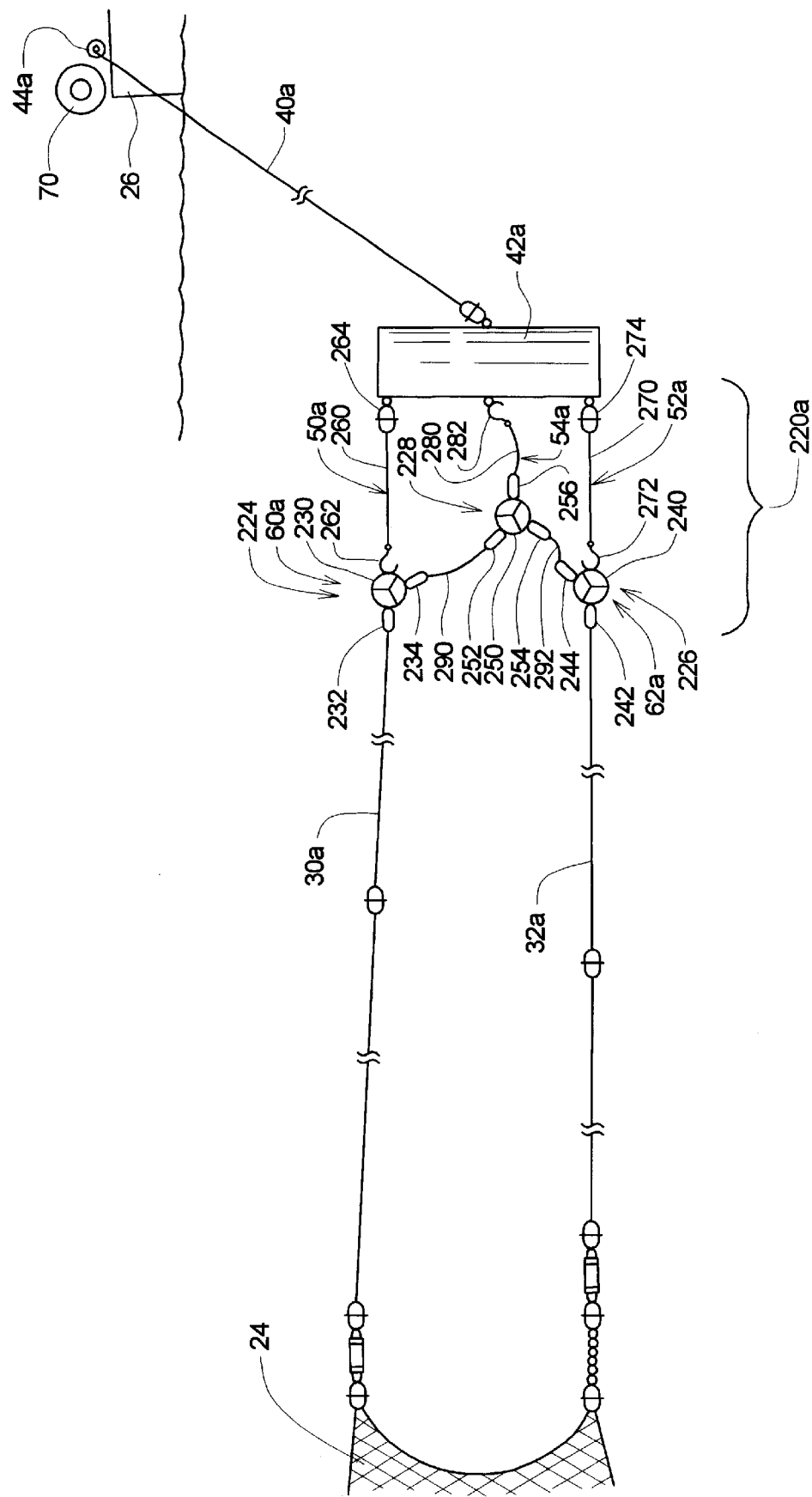
FIG. 6 is a somewhat schematic side elevation view depicting one half of a second exemplary trawling system incorporating the rigging system of the present invention, with the other half of the trawling system being substantially symmetrical to the half shown.

Referring now to FIG. 6, one-half of another exemplary embodiment the rigging system 22 is identified by reference character 220 therein. The other half of the rigging system 220 will usually, but not necessarily, be substantially the same as the portion depicted in FIG. 4.

The rigging system 220 comprises, in addition to the first and second door leg assemblies 50 and 52, slack line assembly 54, and pennant line assembly 56, first and second connector assemblies 224 and 226 located at the connection points 60 and 62, and a third connector assembly 228 connected between the connection points 60 and 62 as will be described in detail below.

The first connector assembly 224 comprises a first main member 230 and first and second link members 232 and 234. The second connector assembly 226 comprises a second main member 240 and third and fourth link members 242 and 244. The third connector assembly 228 comprises a third main member 250 and fifth, sixth, and seventh link members 252, 254, and 256.

The exemplary door leg assembly 50 comprises a first door leg 260, a detachable connector 262, and a fixed connector 264. The exemplary door leg assembly 52 similarly comprises a second door leg 270, a detachable connector 272, and a fixed connector 274. The fixed connectors 254 and 264 are connected to the door assemblies 42 in a conventional manner. The exemplary slack assembly 54 comprises a slack line 280 and a detachable connector 282. The exemplary pennant line assembly 56 comprises first and second pennant lines 290 and 292.

The upper bridal line 30 is connected to the first link member 232, while the lower bridal line 32 is connected to the third link member 242. The first pennant line 290 is connected at one end to the second link member 234 and at the other end to the ninth link member 252. The second pennant line 292 is connected at one end to the fourth link member 246 and at the other end to the tenth link member 246. One end of the slack line 280 is connected to the eleventh link member 246.

The first and second door legs 250 and 260, the slack line 270, and the pennant line 280 are preferably all made of torqueless line.

When the door assembly 42 is connected to the bridal lines 30 and 32 through the rigging system 22, the trawling system 20 may operate in a conventional manner. In use, the system 220 differs from the system 120 only in that the, when the slack lines 280 are placed in tension, these loads are applied evenly to both the upper and lower bridal lines 30 and 32.

Figure 7:
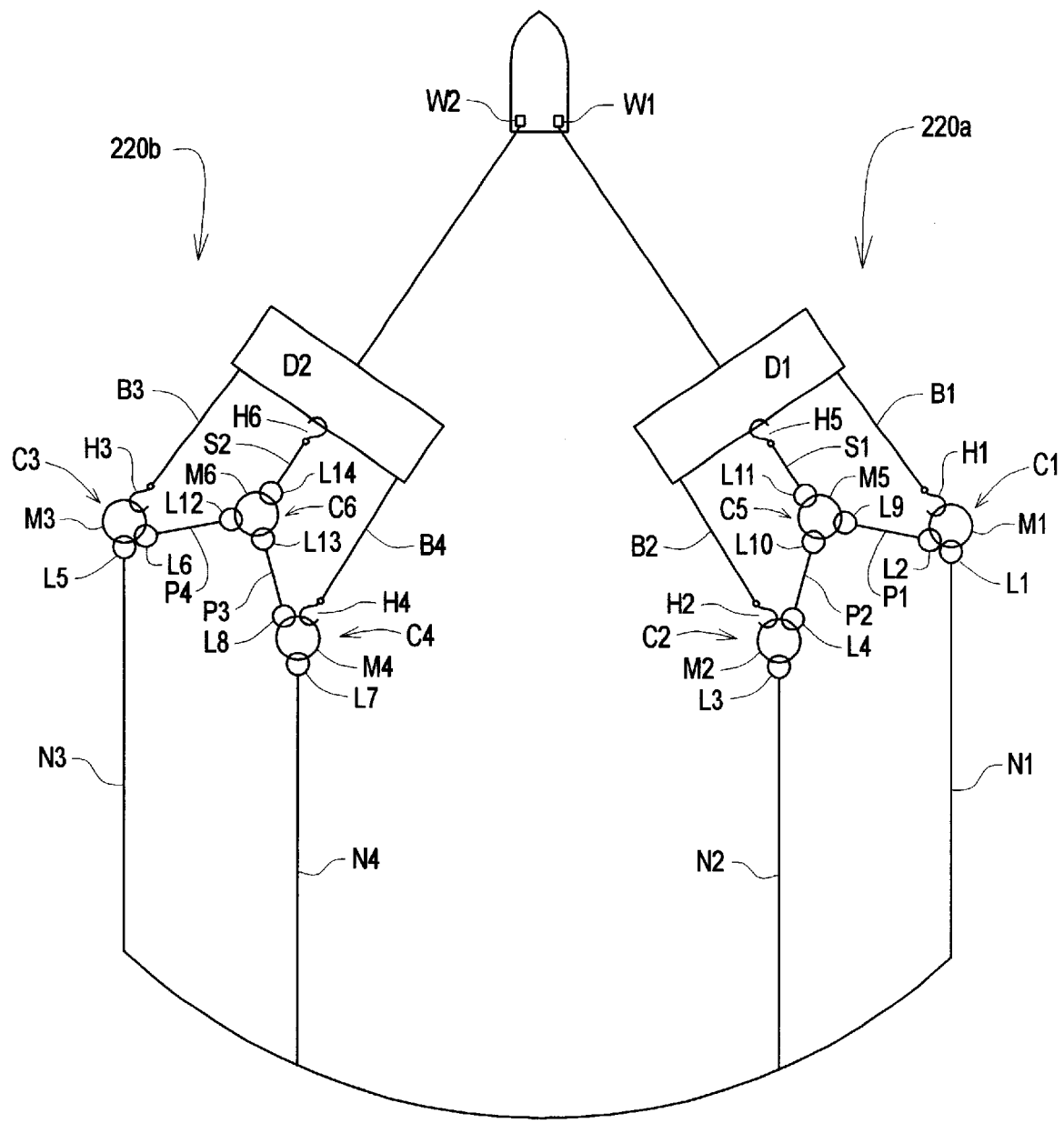
FIG. 7 is a highly schematic top plan view of the trawling system of FIG.6.

Referring now to FIG. 7, depicted therein is a highly schematic representation of the rigging system 220 similar to the representation of the rigging system 120 contained in FIG. 3. FIG. 7 uses the letters C, M, L, N, B, S, P, H, D, and W as described above with reference FIG. 3. The numbers following these letters thus uniquely identify each of the non-trivial components of the entire system 220.

Referring now to FIG. 4, depicted at 320 therein is an exemplary connector that may be used as part of the rigging systems 120 or 220 described above. The connector 320 comprises a rigid metal main member 322. The exemplary main member 322 comprises a perimeter portion 324 and a center portion 330 comprising first, second, and third spoke portions 332, 334, and 336. The exemplary perimeter portion 324 is annular and defines a hole 340; the spoke portions 332, 334, and 336 divide the hole 330 into first, second, and third voids 342, 344, and 346.

The connector 320 further comprises a first link member 350, a second link member 352, and, optionally, a third link member 354. The exemplary link members 350–354 are rigid elliptical metal members that extend through one of the voids 342–346 to interlock the link members 350–354 onto the main member 322. As shown in the drawing, the first link member 350 extends through the first void 342 and the second and, if used, third link members 352 and 354 extend through the third void 346. The second void of the exemplary connector 320 is left empty to allow a hook 356 to be attached thereto during use.

The connector 320 as shown can be used to form any of the connectors 122,124, 222, or 224 described above. The third link member 354 may be omitted if the connector 320 is used as the connectors 122 or 222. The connector 32 may also be used as the connectors 226, in which case the third link member 354 is preferably interlocked through the third void 344.

Referring now to FIG. 5, depicted at 420 therein is an exemplary connector that may be used as part of the rigging systems 120 or 220 described above. The connector 420 comprises a rigid metal main member 422. The exemplary main member 422 is annular and defines a hole 430.

The connector 420 further comprises a first link member 440 and a second link member 442. Optionally, a third link member may be used, but is not shown in FIG. 5 for purposes of clarity. The exemplary link members 440 and 442 are off the shelf fixed connectors but could be rigid elliptical metal members like the link members 350–354 described above.

As shown in the drawing, the link members 340 and 342 extend through the hole 430 to interlock the link members 340 and 342 to the main member 422. A detachable connector 444 may be placed through the hole 430.

The connector 320 as shown can be used to form any of the connectors 124 or 224 described above. If a third link member is used, the connector 420 may also be used as the connectors 122, 222, or 226 discussed above.

The present invention may be embodied in forms other than those described above; the scope of the invention should thus be determined by the following claims rather than the foregoing detailed description.

I claim:

1. A rigging system for use in a trawling system comprising first and second winches, first and second spacing door assemblies, a first main wire assembly for connecting the first winch to the first spacing door assembly, a second main wire assembly for connecting the second winch to the second spacing door assembly, a net, first, second, third, and fourth bridal lines connected to the net, and a net drum, the rigging system comprising:

first and second slack line assemblies associated with the first and second door assemblies, respectively;
   first and second door leg assemblies operatively connected to the first spacing door assembly;
   third and fourth door leg assemblies operatively connected to the second spacing door assembly;
   first and second pennant line assemblies associated with the first and second spacing door assemblies, respectively;
   a first connector assembly comprising a first main member and first and second link members interlocked with the first main member;
   a second connector assembly comprising a second main member and third and fourth link members interlocked with the second main member,
   a third connector assembly comprising a third main member and fifth and sixth link members interlocked with the third main member, and
   a fourth connector assembly comprising a fourth main member and seventh and eighth link members interlocked with the fourth main member; whereby
      the first, third, fifth, and sixth link members are attached to the first, second, third, and fourth bridal lines, respectively;
      the first and second door leg assemblies are attached to the first spacing door assembly;
      the third and fourth door leg assemblies are attached to the second spacing door assembly;
      the first and second door leg assemblies are detachably attached to the first and second main members of the first and second connecting assemblies, respectively;
      the third and fourth door leg assemblies are detachably attached to the third and fourth main members of the third and fourth connecting assemblies, respectively;
      the first pennant line assembly is operatively connected to the second and fourth link members of the first and second connecting assemblies;
      the second pennant line assembly is operatively connected to the sixth and eighth link members of the third and fourth connecting assemblies;
      the first slack line assembly is operatively connected to the second connecting assembly and detachably attached to the first spacing door assembly; and
      the second slack line assembly is operatively connected to the fourth connecting assembly and detachably attached to the second spacing door assembly; wherein
         the first, second, third, fourth, fifth, sixth, seventh, and eighth link members are rigid metal members; and
         the bridal, slack, and pennant line assemblies comprise bridal, slack, and pennant lines, respectively, made of torqueless line.

2. A rigging system as recited in claim 1, in which:
   the first pennant line assembly comprises a first pennant line attached to the second and fourth link members; and
   the second pennant line assembly comprises a second pennant line attached to the sixth and eighth link members.

3. A rigging system as recited in claim 2, in which:
the second connector assembly further comprises a ninth link member interlocked with the second main member, where the first slack line assembly is attached to the ninth link member; and
the fourth connector assembly further comprises a tenth link member interlocked with the fourth main member, where the second slack line assembly is attached to the tenth link member.

4. A rigging system as recited in claim 1, in which:
the first pennant line assembly comprises
a first pennant connector assembly comprising a fifth main member and ninth and tenth link members interlocked with the fifth main member;
a first pennant line connected between the second and ninth link members; and
a second pennant line connected between the fourth and tenth link members; and
the second pennant line assembly comprises
a second pennant connector assembly comprising a sixth main member and twelfth and thirteenth link members interlocked with the sixth main member;
a third pennant line connected between the sixth and twelfth link members; and
a fourth pennant line connected between the eighth and eleventh link members.

5. A rigging system as recited in claim 4, in which:
the fifth connector assembly further comprises an eleventh link member interlocked with the fifth main member;
the first slack line assembly comprises a first slack line operatively connected to the second connecting assembly by attaching the first slack line to the eleventh link member; and
the sixth connector assembly further comprises a fourteenth link member interlocked with the sixth main member;
the second slack line assembly comprises a second slack line operatively connected to the fourth connecting assembly by attaching the second slack line to the fourteenth link member.

6. A rigging system as recited in claim 1, in which the first, second, third, and fourth door leg assemblies comprise first, second, third, and fourth door legs and first, second, third, and fourth hook assemblies for detachably attaching the first, second, third, and fourth door legs to the first, second, third, and fourth main members, respectively.

7. A rigging system as recited in claim 1, in which:
the first slack line assembly comprises a first slack line and a fifth detachable connector for detachably attaching the first slack line to the first spacing door assembly; and
the second slack line assembly comprises second slack line and a sixth detachable connector for detachably attaching the second slack line to the second spacing door assembly.

8. A rigging system as recited in claim 6, in which:
the first slack line assembly comprises a first slack line and a fifth detachable connector for detachably attaching the first slack line to the first spacing door assembly; and
the second slack line assembly comprises second slack line and a sixth detachable connector for detachably attaching the second slack line to the second spacing door assembly.

9. A rigging system as recited in claim 1, in which the main members each define main opening, and the link members each extend through the main openings to interlock the link members with the main members.

10. A rigging system as recited in claim 1, in which the main members are each defined by a closed perimeter portion defining a main opening.

11. A rigging system as recited in claim 1, in which the main members each further comprise a plurality of spoke portions that divide the main opening into at least two voids.

12. A rigging system as recited in claim 11, in which the spoke portions divide the main opening into three voids.

13. A rigging system as recited in claim 12, in which:
the first and fifth link members extend through a first void in each of the first and third main members;
the second and sixth link members extend through a second void in each of the first and third main member;
the third and seventh link members extend through a first void in each of the second and fourth main members; and
the fourth and eighth link members extend through a second void in each of the second and fourth main members.

14. A rigging system as recited in claim 3, in which:
the ninth link member extends through the second void in the second main member; and
the tenth link member extends through the second void in the fourth main member; whereby
first and second slack line assemblies are connected to the ninth and tenth link members, respectively.

15. A rigging system as recited in claim 5, in which:
the main members each further comprise a plurality of spoke portions that divide the main opening into three voids;
the first and fifth link members extend through a first void in each of the first and third main members;
the second and sixth link members extend through a second void in each of the first and third main member;
the third and seventh link members extend through a first void in each of the second and fourth main members;
the fourth and eighth link members extend through a second void in each of the second and fourth main members;
the ninth, tenth, and eleventh link members extend through first, second, and third voids in the fifth main member; and
the twelfth, thirteenth, and fourteenth link members extend through first, second, and third voids in the sixth main member.

16. In a trawling system comprising first and second winches, first and second spacing door assemblies, a first main wire assembly for connecting the first winch to the first spacing door assembly, a second main wire assembly for connecting the second winch to the second spacing door assembly, a net, first, second, third, and fourth bridal lines connected to the net, and a net drum, a method of rigging the door assemblies to the first, second, third, and fourth bridal lines comprising the steps of:
providing first and second slack line assemblies for the first and second spacing door assemblies, respectively;
connecting a first spacing door leg assembly and a second door leg assembly to the first spacing door assembly;
connecting a third door leg assembly and a fourth door leg assembly to the second spacing door assembly;

providing first and second pennant line assemblies for the first and second spacing door assemblies, respectively;

interlocking a first link member and a second link member with a first main member to form a first connector assembly;

interlocking a third link member and a fourth link member with a second main member to form a second connector assembly;

interlocking a fifth link member and a sixth link member with a third main member to form a third connector assembly; and interlocking a seventh link member and an eighth link member with the fourth main member to form a fourth connecting assembly;

attaching the first, third, fifth, and sixth link members to the first, second, third, and fourth bridal lines, respectively;

attaching the first and second door leg assemblies to the first spacing door assembly;

attaching the third and fourth door leg assemblies to the second spacing door assembly;

detachably attaching the first and second door leg assemblies to the first and second main members of the first and second connecting assemblies, respectively;

detachably attaching the third and fourth door leg assemblies to the third and fourth main members of the third and fourth connecting assemblies, respectively;

connecting the first pennant line assembly to the second and fourth link members of the first and second connecting assemblies;

connecting the second pennant line assembly to the sixth and eighth link members of the third and fourth connecting assemblies;

connecting the first slack line assembly to the second connecting assembly; detachably attaching the first slack line to the first spacing door assembly; connecting the second slack line assembly to the fourth connecting assembly; and detachably attaching the second slack line to the second spacing door assembly; wherein
the first, second, third, fourth, fifth, sixth, seventh, and eighth link members are rigid metal members; and
the bridal, slack, and pennant line assemblies comprise bridal, slack, and pennant lines, respectively, made of torqueless line.

17. A rigging method as recited in claim 16, in which:
the step of attaching the first and second door leg assemblies to the first spacing door assembly comprises the step of attaching a first pennant line to the second and fourth link members;
the step of attaching the third and fourth door leg assemblies to the second spacing door assembly comprises the step of attaching a second pennant line attached to the sixth and eighth link members; further comprising the steps of
interlocking a ninth link member with the second main member;
attaching the first slack line assembly to the ninth link member;

interlocking a tenth link member with the fourth main member; and
attaching the second line assembly to the tenth link member.

18. A rigging method as recited in claim 16, in which:
the step of providing the first pennant line assembly comprises the steps of
interlocking ninth and tenth link members with a fifth main member to form a fifth connector assembly;
connecting a first pennant line between the second and ninth link members; and
connecting a second pennant line between the fourth and tenth link members; and
the step of providing the second pennant line assembly comprises the steps of
interlocking twelfth and thirteenth link members interlocked with a sixth main member to form a sixth connector assembly;
connecting a third pennant line between the sixth and twelfth link members; and
connecting a fourth pennant line between the eighth and eleventh link members;
the step of connecting the first slack line assembly to the second connector assembly comprises the steps of
interlocking an eleventh link member with the fifth main member;
attaching a first slack line to the eleventh link member; and
the step of connecting the second slack line assembly to the fourth connector assembly comprises the steps of
interlocking a fourteenth link member with the sixth main member; and
attaching a second slack line to the fourteenth link member.

19. A rigging assembly for connecting together bridal and pennant lines of a trawling system, where a detachable connector is attached to the door leg, the rigging assembly comprising:
a main member having
a main portion defining a main opening, and
a plurality of spoke portions dividing the main opening into first, second, and third voids; and
a first link member interlocked with the main member by extending through the first void; and
a second link member interlocked with the main member by extending through the second void; whereby
the detachable connector of the door leg passes through the first void to connect the door leg to the main member;
the bridal line is connected to the first link member to connect the bridal line to the main member;
the pennant line is connected to the second link member to connect the pennant line to the main member; and
the main member transfers loads among the door leg, bridal line, and pennant line; wherein
the first and second link members are rigid metal members; and
the bridal and pennant lines are made of torqueless line.

* * * * *